(12) United States Patent
Madhav et al.

(10) Patent No.: US 10,696,404 B1
(45) Date of Patent: Jun. 30, 2020

(54) APPLICATION OF ARTIFICIAL INTELLIGENCE TO IMPLEMENT AUGMENTED REALITY, VIRTUAL REALITY, AND MIXED REALITY TO ENHANCE PASSENGER EXPERIENCE TO FLYING WITH MOOD LIGHTING

(71) Applicant: The Boeing Company, Chicago, IL (US)

(72) Inventors: Jagdish T. Madhav, Bothell, WA (US); Barry C. Colwell, Marysville, WA (US)

(73) Assignee: Boeing Company, The, Chicago, IL (US)

( * ) Notice: Subject to any disclaimer, the term of this patent is extended or adjusted under 35 U.S.C. 154(b) by 0 days.

(21) Appl. No.: 16/252,966

(22) Filed: Jan. 21, 2019

(51) Int. Cl.
*H04N 5/74* (2006.01)
*B64D 11/00* (2006.01)
*H04N 9/31* (2006.01)

(52) U.S. Cl.
CPC ....... *B64D 11/0015* (2013.01); *H04N 9/3147* (2013.01); *H04N 9/3185* (2013.01)

(58) Field of Classification Search
CPC .............. H04N 9/3147; B64D 11/0061; B64D 11/0014
See application file for complete search history.

(56) References Cited

U.S. PATENT DOCUMENTS

| 9,731,824 B2 | 8/2017 | Madhav | |
| 2014/0085337 A1* | 3/2014 | Velten | B64D 11/0015 345/635 |
| 2014/0160285 A1* | 6/2014 | Barrou | B64D 11/0015 348/144 |
| 2019/0047385 A1* | 2/2019 | Archer | B60J 3/04 |

* cited by examiner

Primary Examiner — Jonathan R Messmore
(74) Attorney, Agent, or Firm — Parsons Behle & Latimer

(57) ABSTRACT

An aircraft includes a fuselage and a cabin area with a plurality of windows. The aircraft includes a plurality of projectors positioned within the cabin area that are oriented toward corresponding windows. The projectors project an image over the glass portion of the corresponding window and surrounding surfaces. The image includes a dark center region that is aligned with the glass portion of the corresponding window, reducing undesired effect on passengers. The dark center region may reduce a reflective glare from the glass portion of the corresponding window. The image may include an outer region around the dark center region, which may be brighter than the dark center region. The outer region may illuminate a window bezel and/or a portion of a cabin sidewall. The aircraft may include a plurality of cameras positioned to acquire an outside image that may be added to the image projected by the projectors.

20 Claims, 7 Drawing Sheets

APPLICATION OF ARTIFICIAL INTELLIGENCE TO IMPLEMENT AUGMENTED REALITY, VIRTUAL REALITY, AND MIXED REALITY TO ENHANCE PASSENGER EXPERIENCE TO FLYING WITH MOOD LIGHTING

BACKGROUND

Field of the Disclosure

The examples described herein relate to a system of projectors within a cabin area of an aircraft with each projector oriented toward a corresponding window and method of projecting an image onto the glass portion of the windows of the cabin area.

Description of the Related Art

Vehicles, especially mass transit vehicles, may include lighting used to create a theme, mood, or effect during travel. For example, color lights, such as light-emitting diodes (LED) may be used to illuminate a portion of the interior with a desired color. For example, an airline may prefer project one color onto the sidewalls of the aircraft during boarding, but a different color during cruising, and maybe even a different color during landing and takeoff procedures. While the use of a number of different LEDs may permit different color schemes in the interior of a vehicle, the LEDs may not permit a wide variation of themes or effects. For example, the lighting only permits the illumination of the cabin in a particular color.

Present lighting schemes may be limited to the color of LEDs already installed on the vehicle, which may limit the number of different colors to just a few colors due to space constraints. The use of LED lighting may require a significant effort if it is desired to change the colors and/or theme that may be displayed within the vehicle especially when requiring an addition of starry skies, shooting stars and/or constellations on the ceiling, sidewalls, panels, and/or partition walls of a vehicle, such as an aircraft. Present lighting systems also do not address reflective glare which may be present from the glass portion of window. The reflective glare may detract from the lighting provided by a LED lighting system. Present lighting systems may also not be able to change the color and/or theme based on the destination of the aircraft. Other limitations of current vehicle theme and/or lighting systems may exist.

SUMMARY

The present disclosure is directed to a system of projectors within a cabin area of an aircraft with each projector oriented toward a corresponding window and method of projecting an image onto the glass portion of the windows of the cabin area.

One example of the present disclosure is an aircraft having a fuselage and a cabin area within an interior of the fuselage. The aircraft includes a plurality of windows positioned along the fuselage within the cabin area. Each window includes a glass portion with a perimeter shape. The aircraft includes a plurality of projectors positioned within the cabin area. Each projector is oriented toward a corresponding window and is configured to project an image over the glass portion and surrounding surfaces (outer region) of the corresponding window. The image includes a dark center region having a profile that corresponds to the perimeter shape of the glass portion of the corresponding window. The dark center region is aligned with the glass portion of the corresponding window.

The projection of the dark center region may reduce a reflective glare from the glass portion of the corresponding window. The image may include an outer region positioned around the dark center region. The outer region may have a brightness that is brighter than the dark center region. The outer region may illuminate a window bezel that surrounds the glass portion of the corresponding window. The outer region may illuminate a portion of a cabin sidewall adjacent to the corresponding window. The outer region may include a pattern projected on the portion of the cabin sidewall adjacent to the corresponding window. The plurality of projectors may be positioned on an overhead region within the cabin area.

The aircraft may include a plurality of cameras that are positioned near the perimeter of windows to acquire an outside image that is outside of one of the corresponding windows. The images projected by each of the plurality of projectors may include the outside image of the corresponding window acquired by one of the plurality of cameras.

One example of the present disclosure is a method including positioning a plurality of projectors in a cabin area of an aircraft and orienting each of the plurality of projectors to a corresponding window in the cabin area of the aircraft. Each corresponding window has a glass portion with an outer profile. The method includes projecting an image from each projector over the glass portion and surrounding surface of the corresponding window. The image has a dark center region, wherein a perimeter of each dark center region is aligned with the outer profile of the glass portion of the corresponding window.

The method may include positioning each of the plurality of projectors on an overhead region in the cabin area of the aircraft. The method may include reducing a reflective glare of the glass portion and surrounding surface of the corresponding window. The image projected from each projector may include an outer region positioned around the dark center region. The method may include illuminating a portion of the cabin area with the outer region of each projected image. The method may include acquiring an outside image of the aircraft with a camera, wherein the image projected from each projector include the outside image acquired with the camera.

One example of the present disclosure is an aircraft projection system having at least one projector being oriented toward a corresponding window, the corresponding window having a glass portion with an outer perimeter. The system includes an image projected by the at least one projector, the image being projected over the glass portion of the corresponding window and the image includes a dark center region having an outer profile, the outer profile being aligned with the outer perimeter of the glass portion of the corresponding window.

The image projected by the at least one projector may include an outer region positioned around the dark center region, the outer region being brighter than the dark center region. The outer region may illuminate a portion of a sidewall positioned adjacent to the corresponding window. The system may include at least one camera positioned to acquire an outside image that is outside of the corresponding window. The image projected by the at least one projector includes the outside image of the corresponding window acquired by the at least one camera. This will result in sidewall illumination, part of the existing cabin illumination system to provide passengers a special cabin mood lighting system.

Figure 1:
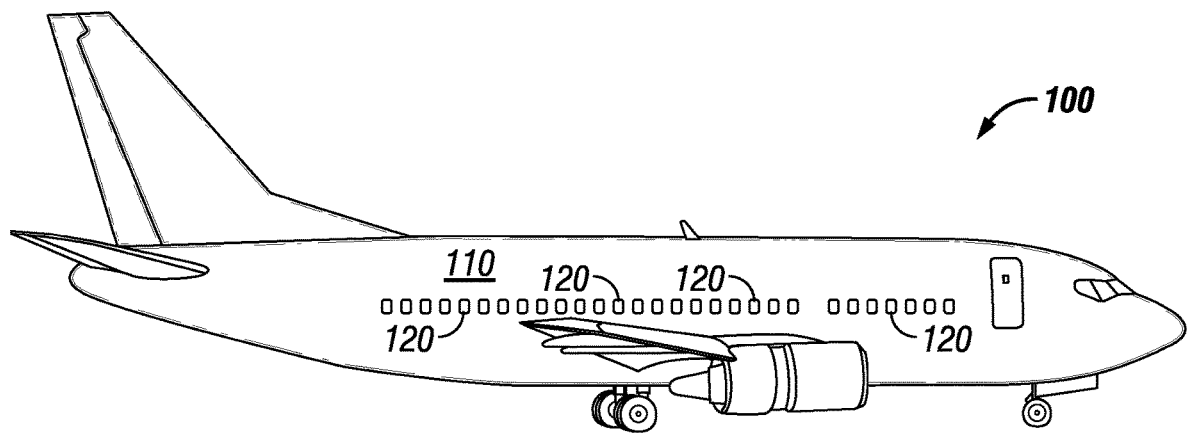
FIG. 1 is a schematic of one example of an aircraft having a plurality of windows.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 2:
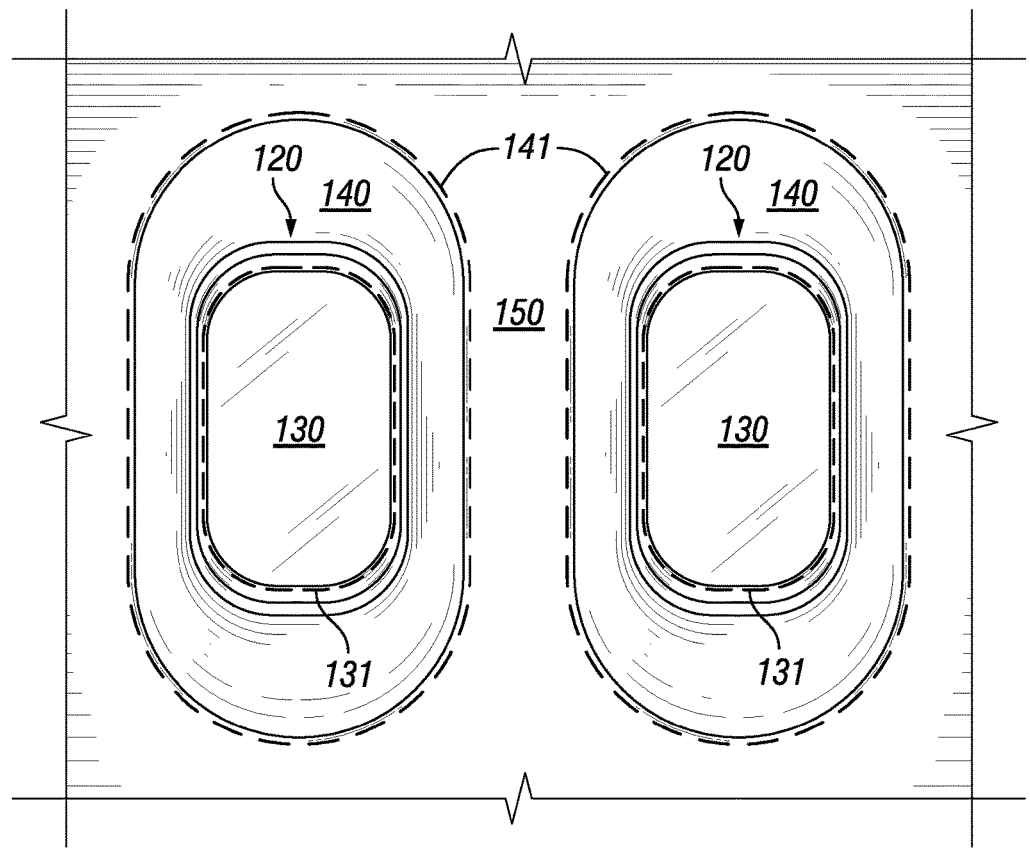
FIG. 2 is schematic of an example of a portion of a cabin area within an aircraft having a plurality of windows.

FIG. 1 is a schematic of an aircraft, also referred to as an airplane, 100 that has a plurality of windows 120 along the fuselage 110 of the aircraft 100. FIG. 2 is schematic of an example of a portion of a cabin area 160 (best shown in FIG. 8) within an interior of the fuselage 110 of the aircraft 100, the cabin area 160 having a plurality of windows 120. Each window 120 includes a glass portion 130 having a perimeter shape, also referred to as an outer profile or an outer perimeter, 131. The perimeter shape 131 is the outer edge of the glass portion 130 of the window 120. The cabin area 160 of the aircraft 100 may include a window bezel, also referred to as a window surround, 140 that surrounds the glass portion 130 of the window 120. At an outer perimeter 141 of the window bezel 140, the window bezel 140 meets the sidewall 150 of the cabin area 160. The sidewall 150 of the cabin area 160 may be the inner surface of the fuselage 110 of the airplane 100 as would be appreciated by one of ordinary skill in the art. The size, shape, number, and/or configuration of the windows 120, glass portions 130, window bezel 140, and/or sidewall 150 are shown in FIGS. 1 and 2 for illustrative purposes and may be varied as would be appreciated by one of ordinary skill in the art having the benefit of this disclosure. For example, the window 120 may not include a window bezel 140 between the glass portion 130 and the sidewall 150.

Figure 3:
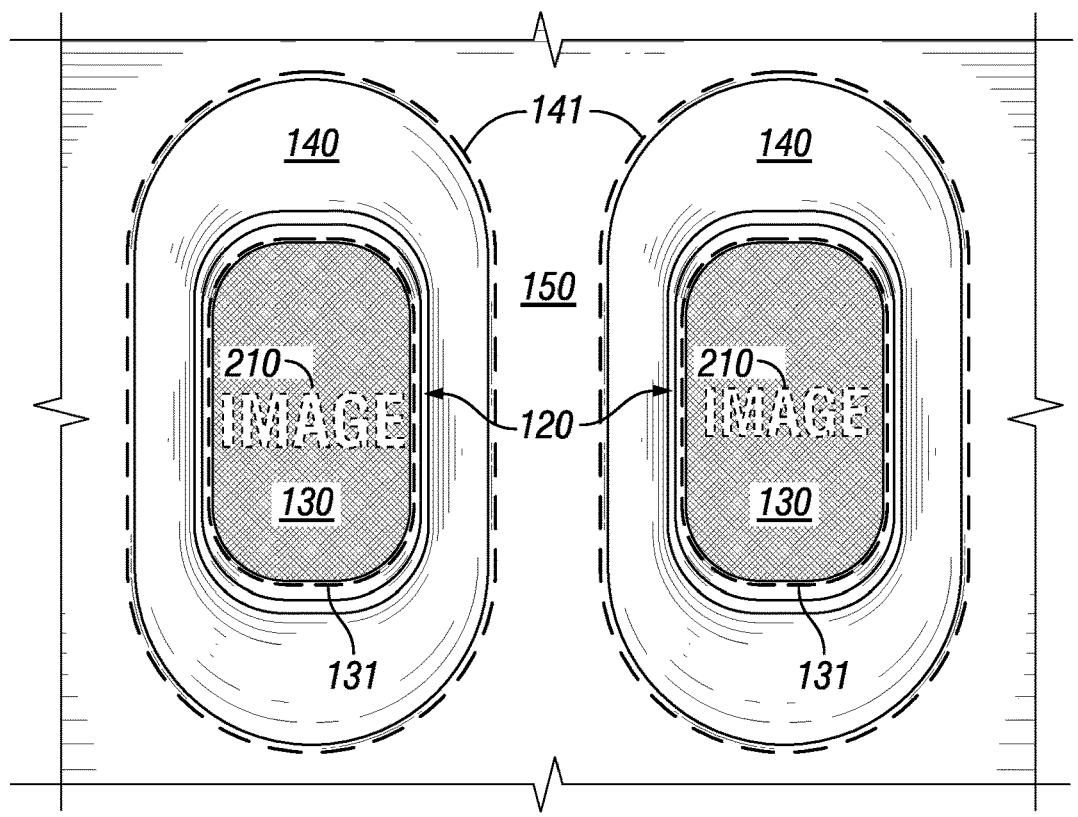
FIG. 3 is a schematic of an example of an image having a dark center region projected over the glass portion of a window of an aircraft.
Figure 8:
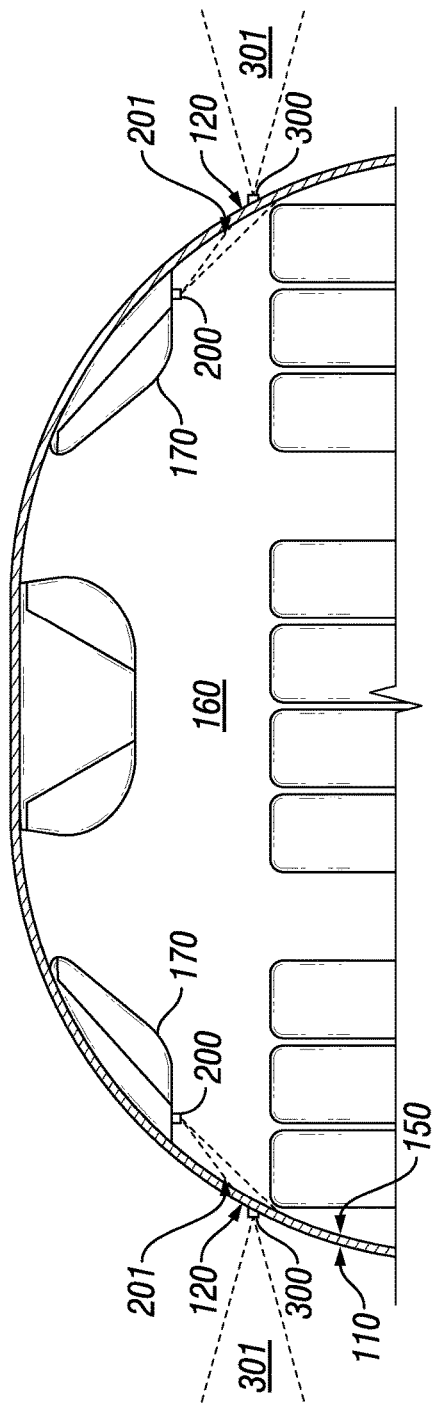
FIG. 8 is a schematic of an example of a cross-sectional view of an aircraft having a cabin area with projectors mounted on an overhead region in the cabin area and cameras oriented to capture an image outside of the aircraft for the corresponding projector.

The aircraft 100 includes an aircraft projection system that includes a plurality of projectors 200 positioned within the cabin area 160 of the aircraft 100 as best shown in FIG. 8. Each of the projectors 200 is oriented toward a corresponding window 120 of the aircraft 100. Each projector 200 is configured to project an image over the glass portion 130 of the corresponding window 120 as shown in FIG. 3. The image includes a dark center region 210 having a profile, also referred to as a perimeter or an outer profile, 211 (shown in FIG. 6). The profile 211 of the dark center region 210 of the image is aligned with the glass portion 130 of the corresponding window 120. In other words, the profile, also referred to as perimeter or outer profile, 211 of the dark center region 210 of the image is aligned with the perimeter shape, also referred to as an outer profile or an outer perimeter, 131 of the glass portion 130 of the corresponding window 120. The projection of the dark center region 210 onto the glass portion 130 reduces a reflective glare from the glass portion 130 into the cabin area 160 of the aircraft 100. The projectors 200 may be configured to automatically focus the image so that the dark center region 210 is aligned with the glass portion 130 of the corresponding window 120. The dark center region 210 of the image projected by the projectors 200 may be various images as would be appreciated by one of ordinary skill in the art having the benefit of this disclosure.

The plurality of projectors 200 within the cabin area 160 of the aircraft 100 are configured to reduce the reflective glare from the glass portions 130 of the windows 120 within the cabin area 160 by orienting a projector 200 towards each window 120 within the cabin area 160 of the aircraft 100. The projectors 200 may be a small projector, such as a pico or mini projector, allowing the projectors 200 to be discretely positioned along the cabin area 160 of the aircraft 100. The projectors 200 may be positioned along an overhead region 170 of the cabin area 160 (as shown in FIG. 8) to enable the projectors 200 to be oriented to an adjacent corresponding window 120 without being in the way of passengers located within the aircraft 100.

Figure 4:
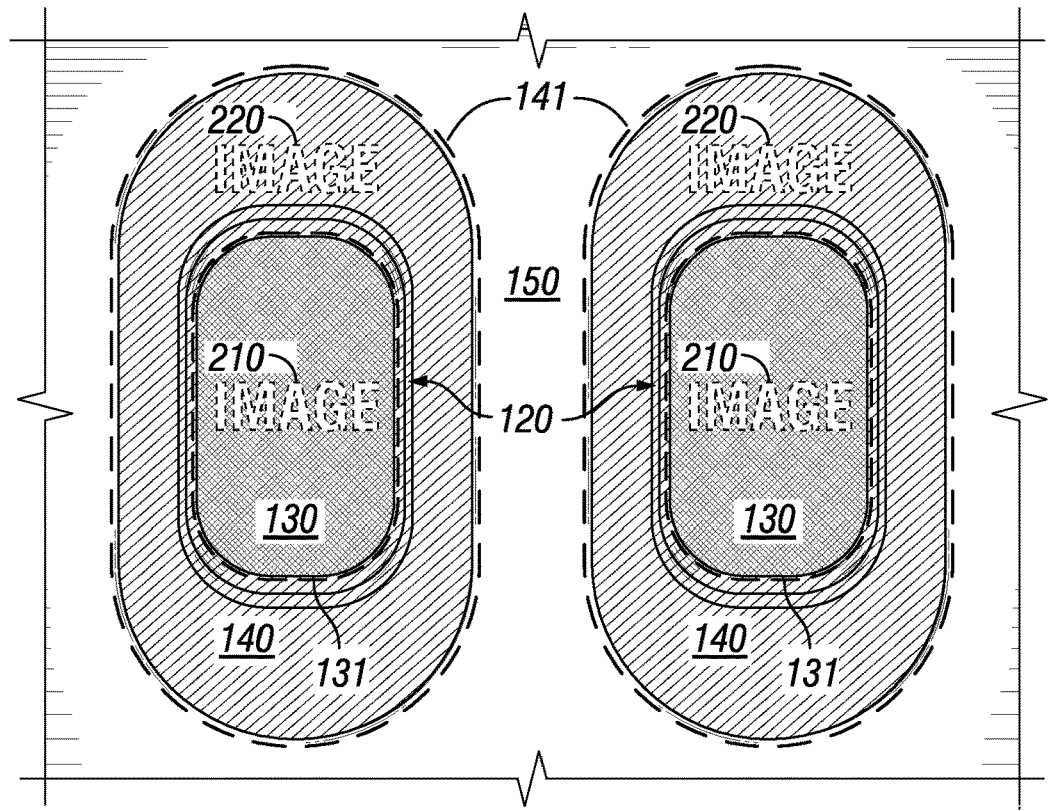
FIG. 4 is a schematic of an example of an image having a dark center region projected over the glass portion of a window of an aircraft and the image having a brighter outer region around the dark center region.

FIG. 4 shows that the image projected by each projector 200 to a corresponding window 120 includes an outer region 220 positioned around the dark center region 210. Typically, the outer region 220 has a brightness that is brighter than the dark center region 210. As discussed herein, the dark center region 210 is configured to reduce the reflective glare from the glass portion 130 of the window 120. The outer region 220 may illuminate the window bezel 140 that surrounds the glass portion 130 of the window 120. In the event the window 120 does not include a window bezel 140, the outer region 220 may illuminate a portion of the sidewall 150 of the cabin area 160 of the aircraft 100. The outer region 220 may include a profile, also referred to as a perimeter or an outer profile, 221 (shown in FIG. 6). The profile 221 of the outer region 220 may be aligned with the outer perimeter 141 of the window bezel 140.

Figure 5:
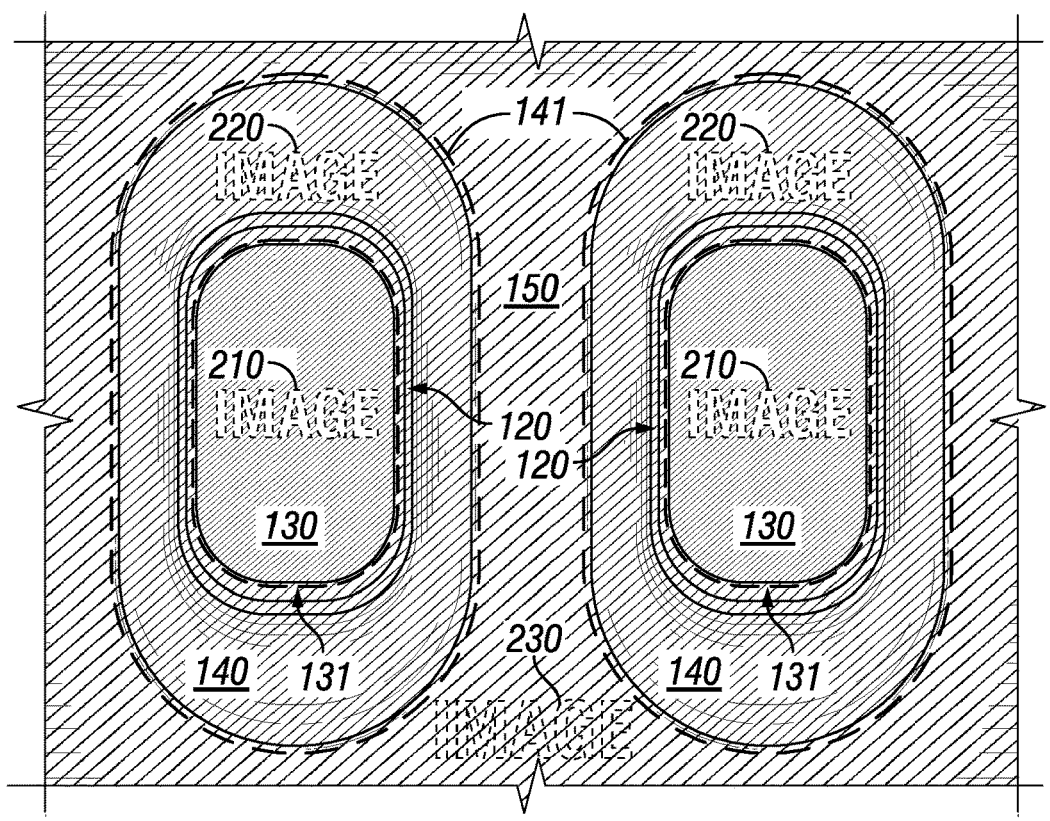
FIG. 5 is a schematic of an example of an image having a dark center region projected over the glass portion of a window of an aircraft, the image having a brighter outer region around the dark center region, and the image having a third region projected on the sidewall of the aircraft.

FIG. 5 shows the projectors 200 may project an image 230 onto the sidewall 150 adjacent to a window 120. The image 230 on the sidewall 150 may be used to illuminate the sidewall 150 of the cabin area 160 of the aircraft 100. The image 230 on the sidewall 150 may be an extension of the outer region 220 projected by each projector 200. The projectors 200 may be configured so that the image 230 projected by two adjacent projectors 200 seamlessly form a single image 230 onto the sidewall 150 of the aircraft 100. The projectors 200 may include an auto keystone correction that allows adjusts the projected dark center regions 210, outer regions 220, and image 230 to be projected onto surfaces that are non-perpendicular to the axis of the projector 200. The projectors 200 may digitally convert and scale the projected images so that the images are appropriately focused on the projection surface within the aircraft 100.

Figure 6:
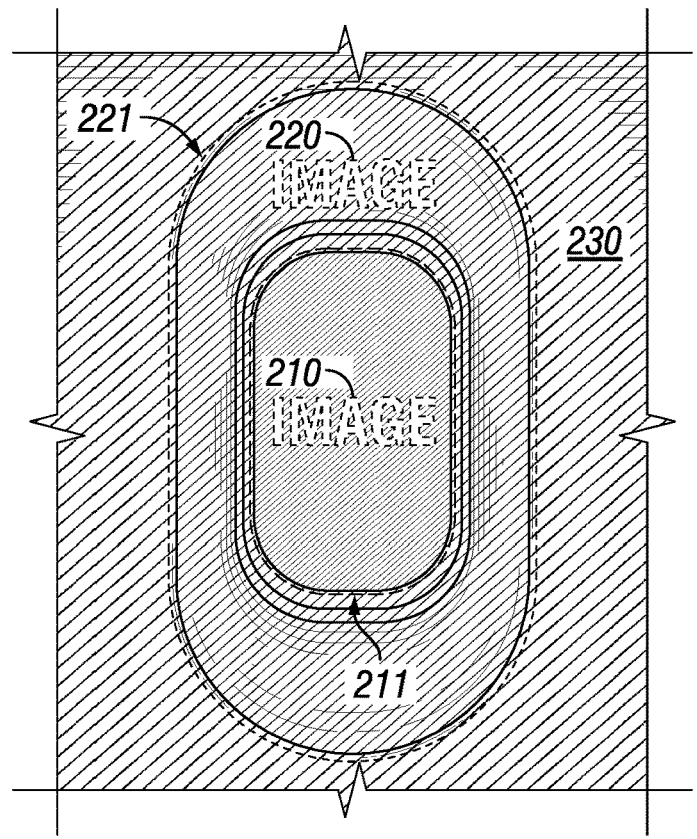
FIG. 6 is a schematic of an example of an image having a dark center region, a brighter outer region surrounding the dark center region, and a third region.

FIG. 6 is a schematic of an example of an image having a dark center region 210, a brighter outer region 220 that surrounds the dark center region 210, and a third region 230 that is beyond the outer region 220. The dark center region 210 includes a profile, also referred to as a perimeter or an outer profile, 211. Likewise, the outer region may include a profile, also referred to as a perimeter or an outer profile, 221. In some embodiments, the third region 230 may merely be an extension of the outer region 220. The size, shape, number, and/or configuration of the dark center region 210, outer region 220, and/or third region 230 are shown in FIGS. 3-6 for illustrative purposes and may be varied as would be appreciated by one of ordinary skill in the art having the benefit of this disclosure. For example, the outer region 220 and/or the third region 230 may be a pattern as discussed herein.

Figure 7A:
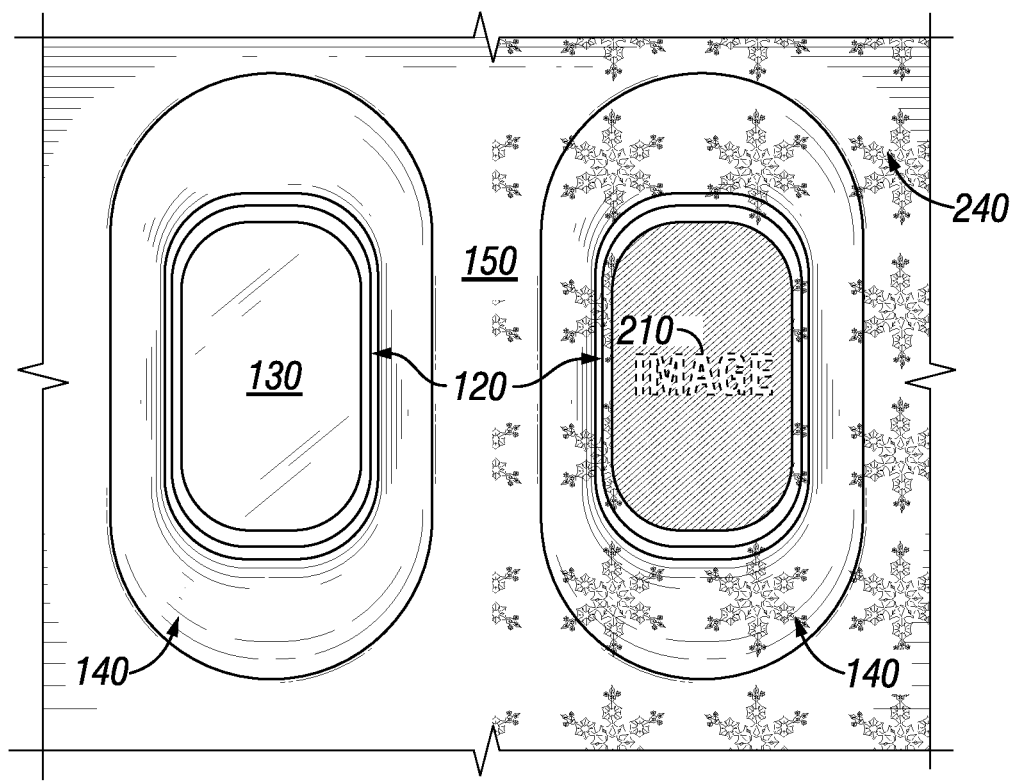
FIG. 7A is a schematic of an example of an image having a dark center region projected over the glass portion of a window of an aircraft and the image comprising a pattern projected around the dark center region.

FIG. 7A is a schematic of an example of an image having a dark center region 210 projected over the glass portion 130 of a window 120 of an aircraft 100 and an image comprising a pattern 240 projected around the dark center region 210. The pattern 240 may be projected over a window bezel 140 and sidewall 150 within the cabin area 160 of the aircraft 100. FIG. 7A shows the dark center region 210 and pattern 240 projected over a window adjacent to a window 120 without any projected images for illustrative purposes. The size, shape, number, and/or configuration of the pattern 240 is shown in FIG. 7A for illustrate purposes as various patterns may be projected onto the window bezel 140 and/or sidewall 150 as would be appreciated by one of ordinary skill in the art having the benefit of this disclosure. For example, the projected pattern 240 could be, but is not limited to, a laminate pattern projected on the wall to provide the effect that the sidewall 150 of the aircraft 100 includes a laminate covering of identical pattern printed.

Figure 7B:
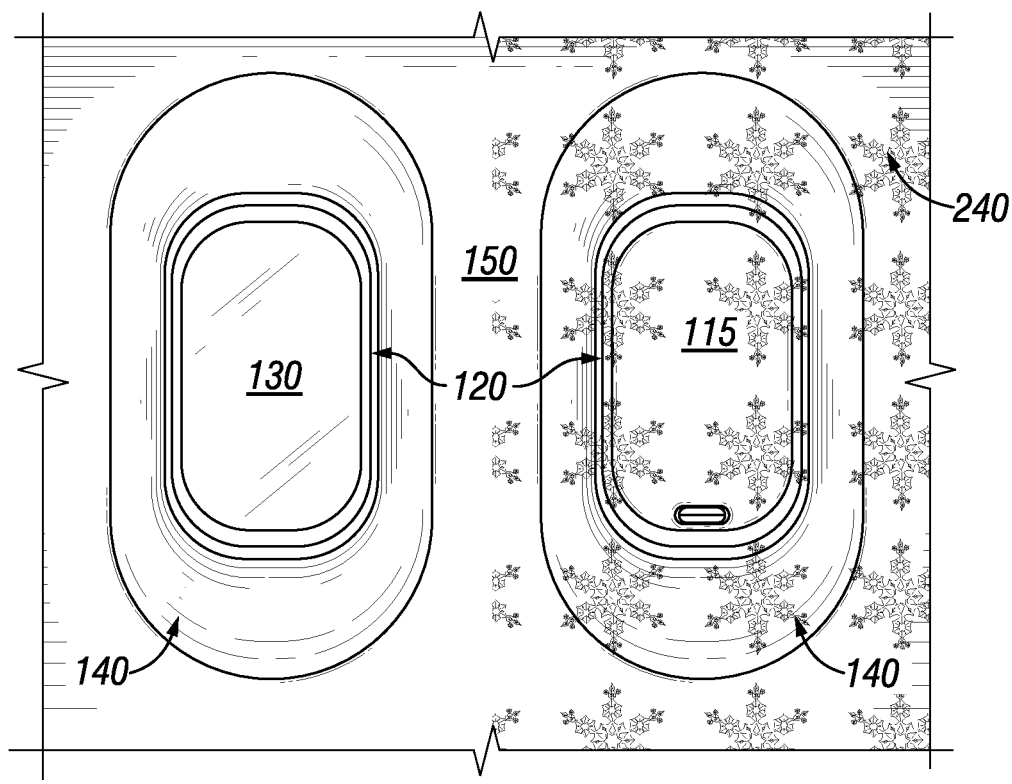
FIG. 7B is a schematic of an example of an image projected over a window and surrounding portion with the image comprising a pattern.

FIG. 7B is a schematic of an example of an image projected a window 120 of an aircraft 100 with the image comprising a pattern 240. A window shutter 115 is pulled down over the glass portion 130 of the window 120. The pattern 240 is projected over the window shutter 21, the window bezel 140, and the sidewall 150 within the cabin area 160 of the aircraft 100. FIG. 7B shows pattern 240 projected over a window 120 adjacent to a window 120 without any projected images for illustrative purposes. The size, shape, number, and/or configuration of the pattern 250 is shown in FIG. 7B for illustrate purposes as various patterns may be projected onto the window 120 and surrounding area as would be appreciated by one of ordinary skill in the art having the benefit of this disclosure. For example, the projected pattern 240 could be, but is not limited to, a laminate pattern projected on the wall to provide the effect that the window 120 and sidewall 150 of the aircraft 100 include a laminate covering of identical pattern printed.

FIG. 8 is a schematic of an example of a cross-sectional view of an aircraft 100 having a cabin area 160 with projectors 200 mounted on an overhead region 170 in the cabin area 160. Each projector 200 is oriented so that it will have a field of view 201 that is oriented towards a corresponding window 120. As discussed herein, each projector 200 will project a dark center region 210 onto the glass portion 130 of the corresponding window 120 to reduce the reflective glare from the glass portion 130 of the corresponding window 120. The projector 200 may project an image onto the sidewall 150 of the aircraft, which may illuminate the sidewall 150 as discussed herein. Various images may be projected to illuminate the sidewall 150. For example, the images may a color projected onto the sidewall 150 to illuminate the cabin area 160. The color projected onto the sidewall 150 may change depending on the status of the aircraft 100. For example, one color may be projected during boarding, another color may be projected during takeoff, and yet another color may be projected during the flight in concert with the rest of the cabin mood lighting plan controlled from the attendant control panel 400 shown in FIG. 10.

The aircraft projection system of the aircraft 100 may include a plurality of cameras 300 position to capture an image from outside of the aircraft 100. The cameras 300 have a field of view 301 directed outside of the aircraft 100. The images captured by the cameras 300 may be communicated to the projectors 200 positioned within the cabin area 160. The projectors 200 may project the outside images onto the sidewall 150 and/or window bezel 140. The projectors 200 in combination with the cameras 300 may provide actual real time images (Augmented Reality) within the cabin 160 while projecting a dark center region 210 onto the glass portions 130 of the windows 120 to reduce reflective glare. The projectors 200 and/or cameras 300 may be retrofit onto an aircraft 100 not currently having these features. The size, shape, number, and/or configuration of the projectors 200 and cameras 300 as shown in FIG. 8 for illustrative purposes and may be varied depending on the application as would be appreciated by one of ordinary skill in the art having the benefit of this disclosure.

Figure 9B:
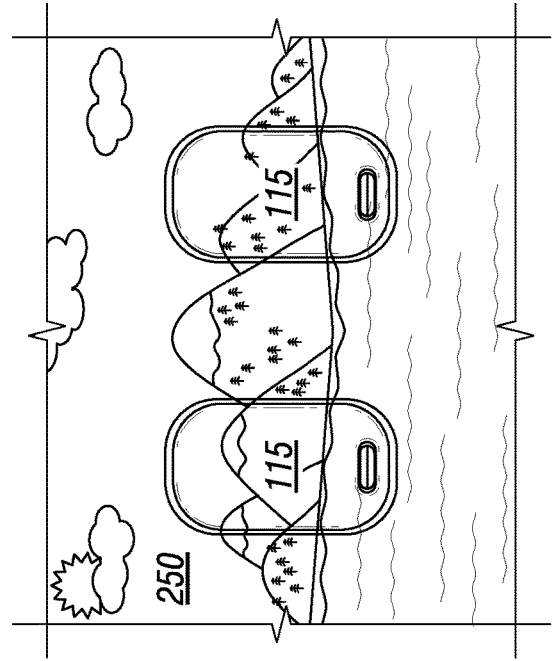
FIG. 9B is a schematic of an example of an image projected over the window and surrounding area of an aircraft, the image comprising an outside view.
Figure 9A:
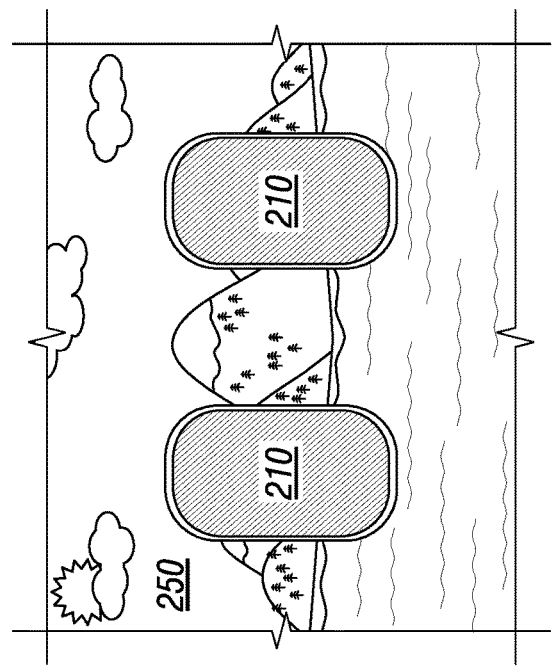
FIG. 9A is a schematic of an example of an image having a dark center region projected over the glass portion of a window of an aircraft and the image comprising an outside view projected around the dark center region.

FIG. 9A is a schematic of an example of an image having a dark center region 210 projected over the glass portion 130 of a window 120 of an aircraft 100. An outside image 250 is projected on the sidewall 150 of the aircraft adjacent to the dark center regions 210. The outside image 250 may be a Virtual Reality (VR) image. The system may use Artificial Intelligence (AI) to determine a scene to be projected by the projectors 200 with the cabin area 160 of the aircraft 100. For example, the system may determine the approximate location of the aircraft based on information from a Global Positioning System (GPS) and project images that are associated with the approximate location of the aircraft 100. In another example, the system may cause the projectors to display virtual reality outside images 250 that are images based on the destination of the aircraft 100.

FIG. 9B is a schematic of an example of an image projected over the window 120 and surrounding area of an aircraft 100. A window shutter 115 is pulled down over the glass region 130 of the window 120 and an outside image 250 is projected over the window 120 and surrounding area include the sidewall 150 of the aircraft 100. The outside image 250 may be a Virtual Reality (VR) image. The system may use Artificial Intelligence (AI) to determine a scene to be projected by the projectors 200 with the cabin area 160 of the aircraft 100. For example, the system may determine the approximate location of the aircraft based on information from a Global Positioning System (GPS) and project images that are associated with the approximate location of the aircraft 100. In another example, the system may cause the projectors to display virtual reality outside images 250 that are images based on the destination of the aircraft 100.

Figure 10:
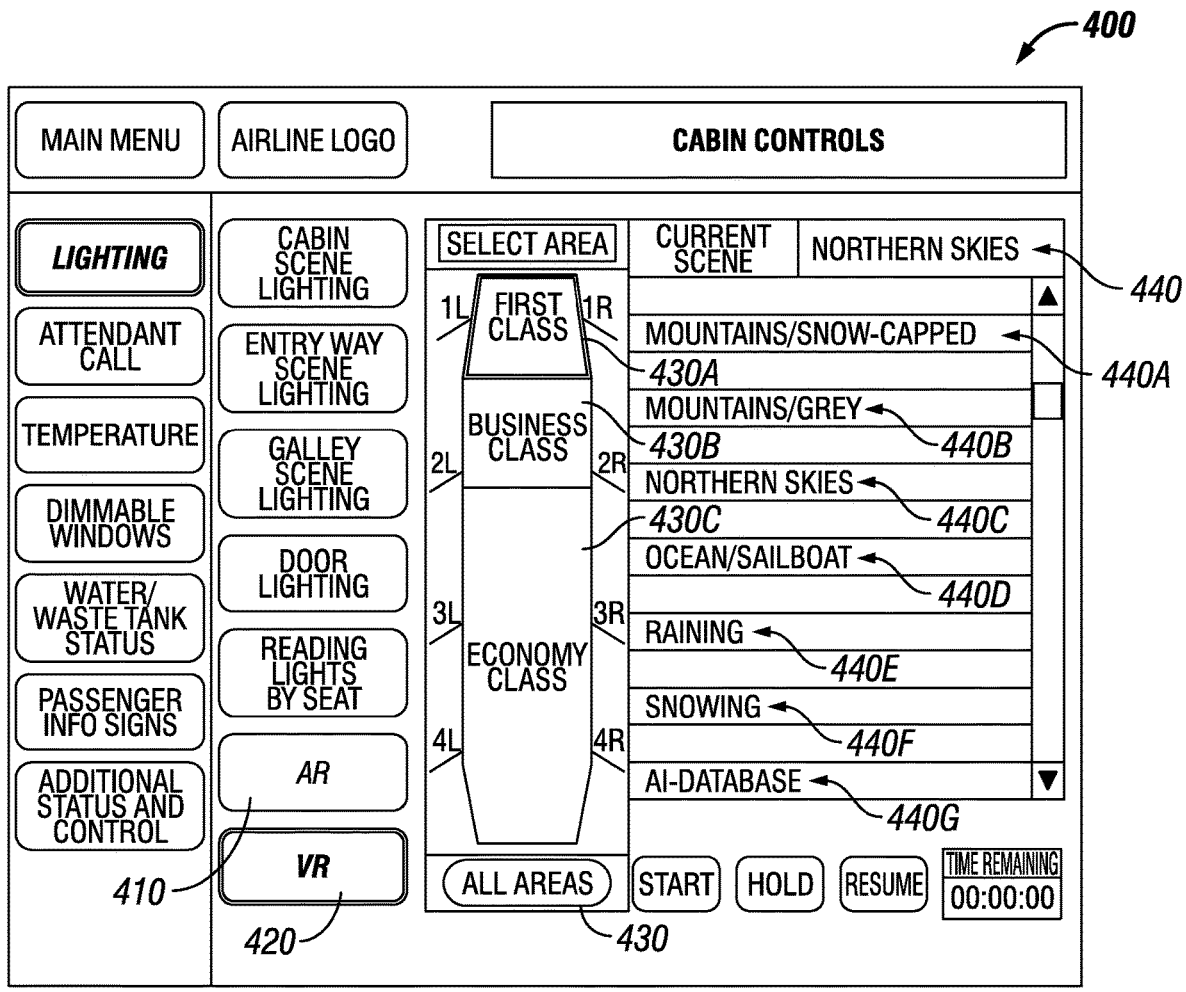
FIG. 10 is a schematic of an example of an attendant control panel for an aircraft.

FIG. 10 is a schematic of an example of an attendant control panel 400 for an aircraft 100. The attendant control panel 400 may be used to control the operation of the projectors 200 and/or the cameras 300. An Augmented Reality (AR) input 410 may be used on the attendant control panel 400 to have cameras 300 feed captured images to the projectors 200 for projection onto the sidewalls 150 and/or window bezels 140 in the cabin area 160 of the aircraft 100. For example, the projectors 200 may project outside images captured by the plurality of cameras 300 positioned along the aircraft 100. A Virtual Reality (VR) input 420 may be used to have the projectors 200 project a virtual reality image onto the sidewalls 150 and/or window bezels 140 in the cabin area 160 of the aircraft 100. For example, the projectors 200 may project an image of the destination location of the aircraft 100 or may project outside images based on the approximate location of the aircraft 100. The control panel 400 may also enable the projection of mixed reality images by the projectors 200. In mixed reality, both AR and VR modes are activated, allowing VR image overlapping on to the real image outside the aircraft 100.

The control panel 400 may be used to project the same image to all area of the cabin 160 using the ALL AREAS input 430. Likewise, the attendant control panel 400 may be used to control the projectors 200 in a certain area of the aircraft 100 via the FIRST CLASS input 430A, the BUSINSESS CLASS input 430B, and the ECONOMY CLASS input 430C.

The control panel 400 may indicate a scene that is currently being displayed in one or more areas of the aircraft 100. For example, the control panel 400 may indicate the CURRENT SCENE at field 440. The control panel 400 may display various scenes that are available to be displayed by the projectors 200. For example, the control panel 400 may display selectable inputs 440A-440F that indicate various scenes that may be selected to be displayed by the plurality of projectors 200 located within the cabin area 160 of the aircraft 100. The control panel 400 may include an AI DATABASE 440G that may be selected to include various other scenes to be displayed or invoke the AI features disclosed herein. The size, shape, number, and/or configuration of the control panel 400, inputs, and/or fields is shown in FIG. 10 for illustrative purposes and may be varied depending on the application as would be appreciated by one of ordinary skill in the art having the benefit of this disclosure.

Figure 11:
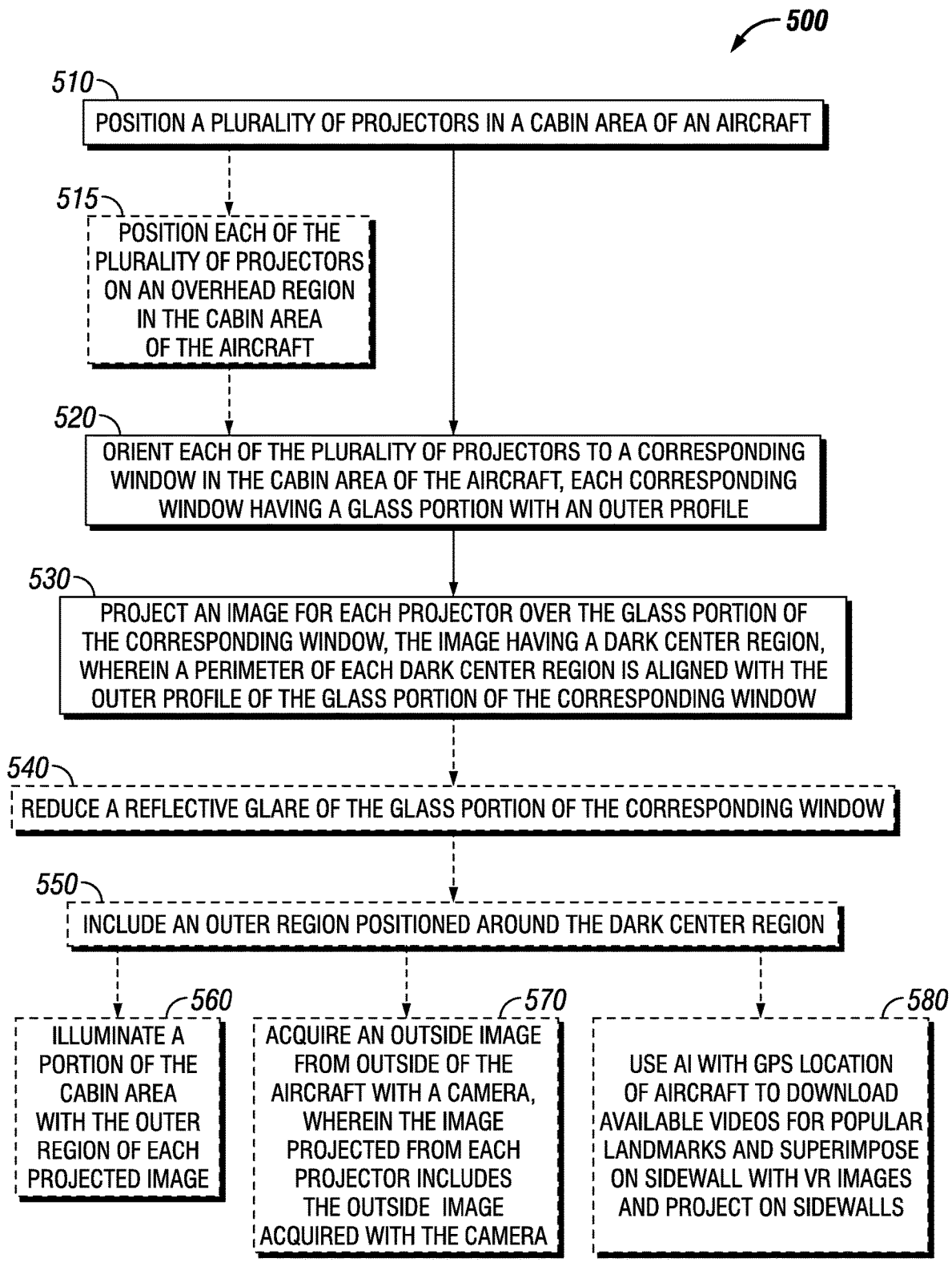
FIG. 11 is a flow chart a method of the present disclosure.

FIG. 11 is a flow chart a method 500 of the present disclosure. The method 500 includes positioning a plurality of projectors in a cabin area of an aircraft, at 510. For example, projectors 200 may be positioned within a cabin area 160 of an aircraft 100. The method 500 includes orienting each of the plurality of projectors to a corresponding window in the cabin area of the aircraft, each corresponding window having a glass portion with an outer profile, at 520. For example, the projectors 200 within the cabin area may each be oriented towards a window 120 in the fuselage 110 of the aircraft 100. The method 500 includes projecting an image for each projector over the glass portion of the corresponding window, the image having a dark center region, wherein a perimeter of each dark center region is aligned with the outer profile of the glass portion of the corresponding window with appropriate magnification, alignment, and focus, at 530. For example, the perimeter 211 of the dark center region 210 may be aligned with the outer profile 131 of the glass portion 130 of the corresponding window 120.

The method 500 may include positioning each of the plurality of projectors on an overhead region in the cabin area of the aircraft, at 515. For example, the projectors 200 may be positioned on an overhead region 170 within the cabin area 160 of the aircraft 100. The method 500 may include reducing a reflective glare of the glass portion of the corresponding window, at 540. For example, the dark center region 210 aligned with the glass portion 130 of the corresponding window 120 may reduce the reflective glare of the glass portion 130. The method 500 may comprise including an outer region positioned around the dark center region, at 550. For example, an outer region 220 may be projected by the projectors 200 with the outer region 220 surrounding the dark center region 210. The method 500 may include illuminating a portion of the cabin area with the outer region of each projected image, at 560. For example, the outer region 220 may be brighter than the dark center region 210 and illuminate a portion of the sidewall 150 and/or window bezel 140. The method 500 may include acquiring an outside image from outside of the aircraft with a camera, wherein the image projected from each projector includes the outside image acquired with the camera, at 570. For example, a camera 300 may capture an image outside of the aircraft 100. The projector 200 may project the captured image onto the sidewall 150 and/or window bezel 140 of the aircraft 100. The method 500 may include acquiring an image, using GPS onboard information, locate the preselected videos, for example, superimpose on the running VR or AR image to blend and make a Mixed Reality (MR) adding to the passenger's experience to the presence of the exterior environment outside the airplane 100, at 580. An added scene may also be snowing or raining to the existing scene from the attendant control panel 400.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. An aircraft comprising:
   a fuselage;
   a cabin area within an interior of the fuselage;
   a plurality of windows positioned along sides of the fuselage within the cabin area, each window having a glass portion with a perimeter shape; and
   a plurality of projectors positioned within the cabin area, each projector being oriented toward a corresponding window, each projector configured to project an image over the glass portion and surrounding surfaces of the corresponding window, the image includes a dark center region having a profile, the profile corresponding to the perimeter shape of the glass portion of the corresponding window, wherein the dark center region is aligned with the glass portion of the corresponding window.

2. The aircraft of claim 1, wherein the projection of the dark center region reduces a reflective glare from the glass portion of the corresponding window.

3. The aircraft of claim 1, wherein the image includes an outer region positioned around the dark center region.

4. The aircraft of claim 3, wherein the outer region has a brightness that is brighter than the dark center region.

5. The aircraft of claim 4, wherein the outer region illuminates a window bezel that surrounds the glass portion of the corresponding window.

6. The aircraft of claim 4, comprising a cabin sidewall within the cabin area, wherein the outer region illuminates a portion of the cabin sidewall adjacent to the corresponding window.

7. The aircraft of claim 6, wherein the outer region includes a design pattern projected on the portion of the cabin sidewall adjacent to the corresponding window.

8. The aircraft of claim 1, comprising an overhead region within the cabin area, wherein the plurality of projectors are each positioned on the overhead region.

9. The aircraft of claim 1, comprising a plurality of cameras, each camera of the plurality of cameras positioned to acquire an outside image that is outside of one of the corresponding windows, wherein each image projected by each of the plurality of projectors includes the outside image of the corresponding window acquired by one of the plurality of cameras.

10. A method comprising:
  positioning a plurality of projectors in a cabin area of an aircraft;
  orienting each of the plurality of projectors to a corresponding window in the cabin area of the aircraft, each corresponding window having a glass portion with an outer profile; and
  projecting an image from each projector over the glass portion of the corresponding window, the image having a dark center region, wherein a perimeter of each dark center region is aligned with the outer profile of the glass portion of the corresponding window.

11. The method of claim 10, wherein positioning the plurality of projectors in the cabin area of the aircraft comprises positioning each of the plurality of projectors on an overhead region in the cabin area of the aircraft.

12. The method of claim 10, wherein projecting the image from each projector over the corresponding window comprises reducing a reflective glare of the glass portion of the corresponding window.

13. The method of claim 12, wherein the image projected from each projector includes an outer region positioned around the dark center region.

14. The method of claim 13, comprising illuminating a portion of the cabin area with the outer region of each projected image.

15. The method of claim 13, comprising acquiring an outside image from outside of the aircraft with a camera, wherein the image projected from each projector includes the outside image acquired with the camera.

16. An aircraft projection system comprising:
  at least one projector being oriented toward a corresponding window, the corresponding window having a glass portion with an outer perimeter; and
  an image projected by the at least one projector, the image projected over the glass portion of the corresponding window and the image includes a dark center region having an outer profile, the outer profile being aligned with the outer perimeter of the glass portion of the corresponding window.

17. The aircraft projection system of claim 16, wherein the dark center region reduces a reflective glare of the glass portion of the corresponding window.

18. The aircraft projection system of claim 17, wherein the image projected by the at least one projector includes an outer region positioned around the dark center region, the outer region being brighter than the dark center region.

19. The aircraft projection system of claim 18, wherein the outer region illuminates a portion of a sidewall positioned adjacent to the corresponding window.

20. The aircraft projection system of claim 19 comprising:
  at least one camera positioned to acquire an outside image that is outside of the corresponding window, wherein the image projected by the at least one projector includes the outside image of the corresponding window acquired by the at least one camera.

* * * * *